Sept. 27, 1966  W. F. SKEATS  3,275,886
INTERRUPTED ARC RESPONSIVE PROTECTIVE EQUIPMENT
FOR SERIES CAPACITORS
Filed April 13, 1964
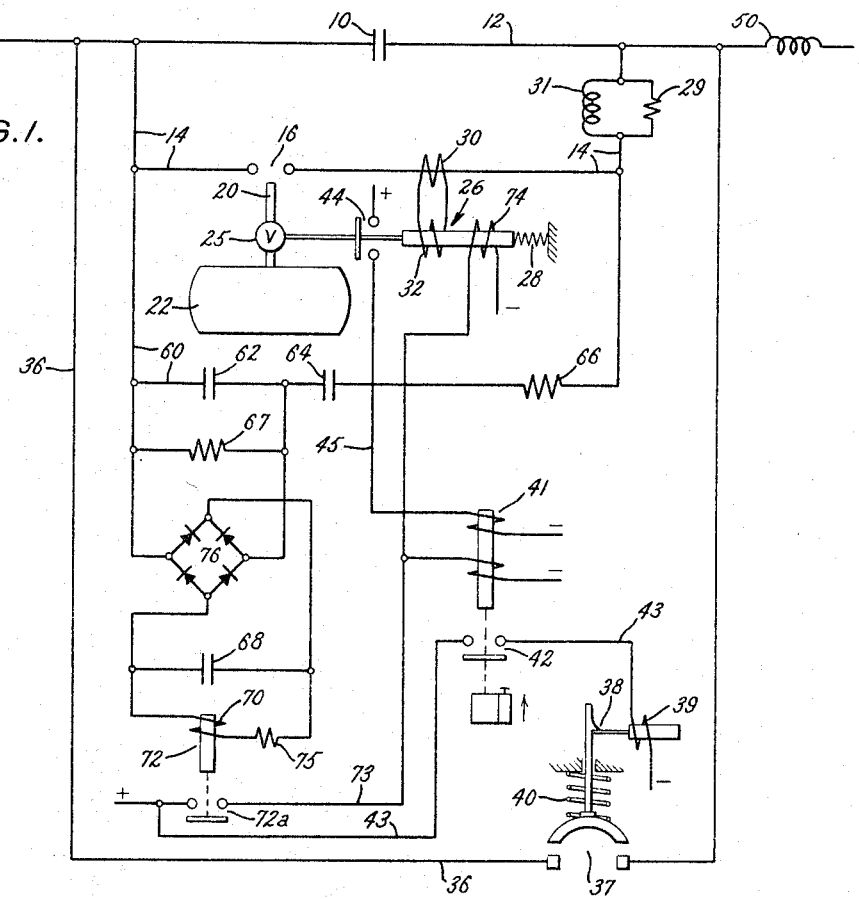
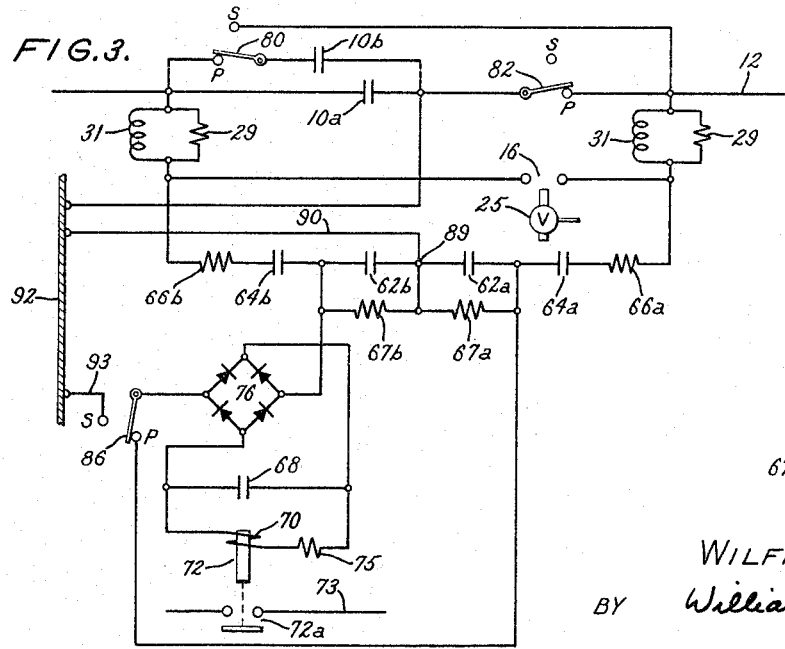
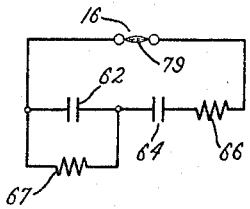
INVENTOR:
WILFRED F. SKEATS,
BY William Freedman
ATTORNEY United States Patent Office
3,275,886
Patented Sept. 27, 1966

3,275,886
INTERRUPTED ARC RESPONSIVE PROTECTIVE
EQUIPMENT FOR SERIES CAPACITORS
Wilfred F. Skeats, Lansdowne, Pa., assignor to General
Electric Company, a corporation of New York
Filed Apr. 13, 1964, Ser. No. 359,218
9 Claims. (Cl. 317—12)

This invention relates to protective equipment for protecting a series capacitor against overvoltages. The invention is particularly concerned with protective equipment of a type that comprises a self-clearing gap device connected in parallel with the capacitor and adapted to arc-over when the voltage across the capacitor rises to a predetermined value.

In one embodiment of the present invention, when the gap device arcs over, a normally-closed blast valve is opened to cause a blast of dielectric fluid to be supplied to the gap device. This blast is so controlled as to maintain the arc-over voltage of the gap device approximately constant after each current zero point is reached. Accordingly, when the voltage developed across the gap device at any current zero is maintained below a predetermined level, the gap device promptly returns the capacitor to the line in which it was originally connected.

If for some reason the gap device continued to arc over for more than a predetermined length of time, it is desirable that it be effectively removed from the circuit in order to protect the gap device from being damaged by prolonged arcing. This is customarily accomplished by providing a timing relay that can respond to this prolonged arcing by causing a permanent bypass circuit to be established around the gap device. The usual timing relay can correctly respond to a condition of prolonged continuous arcing across the gap device. But, for reasons soon to be explained, it will not ordinarily be able to respond correctly to a condition of intermittent arcing, particularly one that is characterized by short pulses of current separated by several cycles of no-current.

An intermittent arcing condition of this nature may arise if the capacitor, for some reason, finds itself in a resonant or near-resonant circuit. In such a circuit, the resonance of the circuit will cause the amplitude of the current through the capacitor to rise over a period of several cycles, and the voltage across the capacitor and its parallel-connected gap device will rise in proportion to the current rise. If the voltage rises to the arc-over voltage of the gap device, the gap device will arc over. But as soon as such arc-over occurs the capacitor is effectively removed from the resonant circuit, eliminating the resonant condition and allowing the current to drop. Assuming that the blast valve of the gap device, which is responsive to current through the gap device, has a low enough operating value to open in response to this low current, the resulting blast will quickly render the gap device non-conductive. This returns the capacitor to the power line, but in doing so, reestablishes the resonant condition. For several electrical cycles no current flows through the gap device, but finally the resonant condition causes another arc-over, and a repetition of the above cycle of events occurs. In prior protective arrangements, the timing relay has allowed this cycle of events to continue indefinitely since the arcing periods have been too short to cause the timing relay to establish the permanent bypass circuit, and it has reset during the no-current intervals between arcing periods.

An object of my invention is to provide means which can sense this intermittent arcing condition and can initiate steps to terminate it.

Another object is to provide means capable of holding the blast valve open throughout a period of intermittent arcing which is characterized by the passage of short current pulses through the gap device separated by no-current intervals as long as several cycles in duration.

Another object is to provide means capable of carrying out the above objectives that will not interfere with the blast valve's ability to reclose reasonably promptly after a normal operation.

In carrying out my invention in one form, I provide blast valve control means which when actuated is capable of maintaining said blast valve in open condition. For controlling actuation of this blast valve control means, I connect across the gap device a voltage divider circuit that comprises the series combination of first and second capacitors, the second capacitor being much larger than the first. A low ohmic resistor is connected across the larger capacitor for providing a discharge path for the larger capacitor and for limiting the voltage across said larger capacitor when the gap device is non-conducting to a relatively low value compared to the voltage across the first capacitor. A third capacitor is connected, through a rectifier, across the larger capacitor; and across this third capacitor the blast valve control means is connected. The rectifier is arranged to permit the larger capacitor and the third capacitor to be charged in parallel but to block the third capacitor from discharging through said resistor. When the gap device is in its normal non-conducting state, the resistor holds the voltage across the second and third capacitors to a value insufficient to cause actuation of the blast valve control means. But when the gap device arcs over, the second and third capacitors are charged with energy from said first capacitor, thereby increasing the voltage across the second and third capacitor sufficiently to cause actuation of the blast valve control means. Thereafter, the second and third capacitors begin discharging. The second capacitor discharges rapidly through the resistor; but the rectifier confines the discharge of the third capacitor to the circuit through the blast valve control means, and this latter discharge takes place relatively slowly, thus maintaining the blast valve control means actuated for a predetermined desired period after the gap device arcs over, even though no current may be flowing through the gap device during a part of this period.

For a better understanding of my invention, reference may be had to the following description taken in conjunction with the accompanying drawings, wherein:

FIG. 1 is a schematic view showing series capacitor protective equipment embodying one form of my invention.

FIG. 2 is a diagrammatic illustration of a portion of the protective equipment of FIG. 1 during one stage of its operation.

FIG. 3 is a schematic illustration of a modified form of my invention.

Referring now to FIG. 1, there is shown a capacitor bank 10 connected in series with a high voltage power line 12, which carries commercial frequency alternating current. In the event of a fault on the power line 12, the current through the power line 12 and the capacitor bank 10 rises toward a high value, and this rapidly increases the voltage across the capacitor bank 10.

For protecting the capacitor bank 10 against this voltage, a normally non-conducting bypass circuit 14 is provided around the capacitor bank. This bypass circuit contains a gap device 16 that is normally non-conducting but is adapted to arc-over when the voltage across the capacitor bank 10 reaches a predetermined value (say, 2.5 times the normal voltage across the capacitor bank), thereby diverting the current around the capacitor bank and thus preventing the capacitor bank from being damaged by overvoltage. The gap device is preferably of the self-clearing type shown and claimed in U.S. Patent 2,760,121—Roth, assigned to the assignee of the present invention. As such, it is capable of continuing to arc-over so long as the fault is present on the power line 12; but immediately upon clearance of the fault, the gap device 16 becomes non-conducting and effectively returns the capacitor bank 10 to the line 12.

The gap device of the aforesaid Roth patent comprises means including a supply line 20 for directing a blast of compressed air from a pressurized source 22 into the arcing region of the gap device 16 immediately upon gap arc-over. This blast is controlled in such a manner that the density of the air in the gap device immediately after each current zero is reached is maintained approximately constant so that the breakdown voltage of the gap device is approximately constant immediately after each current zero is reached. This enables the gap device to restore the capacitor bank to the line on the first current zero when the voltage across the gap device does not reach the initial arc-over voltage. Shortly after current stops flowing through the gap device 16, the air blast is appropriately shut off, thus restoring the gap device 16 to its initial condition. Preferably, a sealed trigger gap and trigger electrode (neither of which is shown) corresponding to the trigger gap 51 and trigger electrode 38, 39 of the aforesaid Roth patent are provided to aid in holding the effective breakdown voltage of the gap device 16 constant despite variations in ambient temperature and pressure.

For initiating and terminating the air blast as above described, a normally-closed blast valve 25 is connected in the supply line 20. The blast valve is controlled by a solenoid 26 which acts to open the blast valve 25 when energized and a spring 28 which acts to reclose the blast valve when the solenoid is deenergized. For energizing the solenoid to open the blast valve when the gap device arcs over, a current transformer 30 connected in series with the gap device is provided. The coil 32 of the solenoid is connected across the secondary of this current transformer 30. When the gap device ceases arcing over, the current transformer 30 is no longer energized and the spring 28 returns the blast valve 25 to closed position to terminate the blast.

The current through the bypass circuit is preferably limited by an impedance in the form of a resistor 29 and inductance 31 connected in parallel with each other and in series with the gap service. This impedance is particularly designed to limit the main capacitor discharge current when the gap device 16 first breaks down.

If the gap device 16 continues arcing over for more than a predetermined length of time, say 15 cycles, it is desirable to establish a permanent bypass circuit, shown at 36, around the capacitor 10 and the gap device 16. This is accomplished in the illustrated embodiment by closing a normally-open shorting switch 37 to complete the permanent bypass circuit 36 if the blast valve should remain continuously open for more than the preselected 15 cycles. The shorting switch 37 is held in its open position shown by a tripping solenoid 39. When the tripping solenoid 39 is energized, it releases the trip latch 38 and permits the shorting switch to close under the bias of a closing spring 40.

For controlling the shorting switch 37, a timing relay 41 is provided. This timing relay 41 is designed to pick up to close its contacts 42 after it has been continuously energized for a predetermined period, which in the assumed case is about 15 cycles. It is also designed to reset quickly to its initial condition after it has been deenergized. When the timing relay 41 picks up to close its contacts 42, it completes an energizing circuit 43 for the tripping solenoid 39 of the shorting switch 37, thus causing the shorting switch to close. The timing relay 41 is energized in response to opening of the blast valve 25 by means of a set of normally-open contacts 44 that close to complete an energizing circuit 45 for the timing relay upon blast valve opening. If the blast valve remains continuously open for about 15 cycles, the timing relay 41 picks up to effect closing of the shorting switch 37 as described.

In some cases, the series capacitor 10 may find itself in a resonant or near-resonant circuit, as for example, when the effective inductance 50 of power line 12 has an inductive reactance substantially equal to the capacitive reactance of the series capacitor 10. When this condition occurs, the current in the power line 12 will rise over a period of about one to three cycles, producing enough voltage across the capacitor 10 and, hence, the gap device 16, to cause the gap device 16 to arc over. This arc-over effectively removes the capacitor 10 from the circuit, eliminating the resonant condition and causing the current to return to a normal value. Assuming that the coil 32 alone is available to operate the solenoid to open the blast valve 25 and assuming further that this coil 32 can produce opening of the blast valve in response to low currents through the gap device, the above-described current resulting from gap arc-over would have caused the blast valve to open, and the resulting blast would have extinguished the arc at an early current zero. This would restore the current through the bypass circuit 14 to zero, deenergizing the blast valve and causing it to reclose.

The above-described extinguishment of the arc in the gap device would effectively return the series capacitor 10 to the power line 12, thus reestablishing the resonant condition. After this resonant condition had prevailed again for several electrical cycles, the current would once again rise high enough to develop a voltage of sufficient magnitude to arc over the gap device 16. Current would flow through the gap device 16 long enough for the blast valve to open and extinguish the arc, after which the blast valve would again reclose. Extinguishment of the arc would again effectively return the capacitor bank 10 to the power line 12, again reestablishing the resonant condition.

In the absence of the resonance-triggering circuit of the present invention (soon to be described), this cycle of events could repeat itself over and over again until the gap 16 failed due to overheating from prolonged arcing. The above-described timing relay 41 would not be able to cause the shorting switch 37 to close because in the several cycles when no current was flowing through the gap device 16 between arc-overs, the timing relay, being deenergized, would reset and the next arcing period would be too short to close its contacts 42.

To overcome this problem, I have provided temporary seal-in means which can hold the blast valve in open position for a long enough time after gap arc-over to prevent the blast valve from reclosing during the several cycles of no current intervening between consecutive current pulses through the arcing gap 16 during a resonant condition such as described above. This temporary seal-in means comprises a resonance-triggering circuit 60 that is connected across the gap device 16 and comprises the series combination of a first relatively large capacitor 62, a second relatively small capacitor 64, and a current-limiting resistor 66. Connected across the relatively large capacitor 62 is a low ohmic resistor 67 and, through a rectifier 76, a third capacitor 68. This third capacitor 68, which is referred to hereinafter as a control capacitor, is relatively small compared to the capacitor 62 across which it is connected. Connected across the control capacitor 68 is the coil 70 of a normally-open blast valve-control relay 72. When the coil 70 is energized sufficiently to operate the relay 72, the relay closes its contacts 72a and completes an energizing circuit 73 for a supplementary operating winding 74 on the blast valve solenoid. Completion of this energizing circuit 73 causes the blast valve 25 to open and remain open so long as the blast valve control relay 72 holds its contacts 72a closed.

Between the relatively large capacitor 62 and the smaller control capacitor 68 connected thereacross, there is a full wave rectifier 76 that permits the capacitors 62 and 68 to be charged in parallel. However, during discharge of the capacitors 62 and 68 (under conditions which will soon be described), the rectifier 76 blocks the control capacitor 68 from discharging through the resistor 67 and forces discharge of the control capacitor 68 to take place through the coil 70 of blast valve control relay 72.

When the gap device 16 is non-conducting, the voltage appearing thereacross is applied to the series combination of the capacitors 62 and 64 and the resistor 66. Under normal 60 cycle conditions, the two capacitors 62 and 64 act as a capacitance-type voltage-divider for this voltage appearing across the gap device 16, but only a tiny fraction of this voltage is present across the capacitor 62 because it is large relative to the other capacitor 64 and also because it is shunted by the low ohmic resistor 67. This voltage appearing across the capacitor 62 and the parallel connected control capacitor 68 is normally held to a sufficiently low value while the gap device is non-conducting to prevent actuation of the blast valve control relay 70. However, when the gap device 16 arcs over, the arc, shown at 79 in FIG. 2, forms a low impedance path through the gap device. A circuit equivalent to that shown in FIG. 2 is established by the arc-over, and the voltage existing across the capacitor 64 is applied to the series combination of resistor 66 and the large capacitor 62. After a brief period in which the capacitor 64 discharges into the larger capacitor 62, the voltage across the larger capacitor 62 will be at high level compared to its voltage preceding gap arc-over. This high voltage will also appear across control capacitor 68 of FIG. 1 since this latter capacitor is in parallel with the capacitor 62 and would have been charged simultaneously with the capacitor 62 through the rectifier 76.

The resistor 67 that shunts the larger capacitor 62 has little effect during the above described brief period when the other capacitor 64 is discharging at a high rate into the large capacitor 62. But at the end of this discharge period, the shunting resistor 67 acts to drain off the charge on the capacitor 62 and thus acts to quickly reduce its voltage. The charge on the parallel control capacitor 68, however, cannot be drained off through the low ohmic resistor 67 since the rectifier 76 between the control capacitor 68 and the resistor 67 blocks such discharge. The control capacitor 68 is thus forced to discharge through the coil of relay 70. This discharge current operates the relay 72 and maintains it in an operated condition until the charge is nearly all drained off the control capacitor 68. The time constant of the circuit containing components 68 and 70 is made sufficiently large that the relay 72 is maintained in an operated condition for several cycles (of 60 cycle frequency current) after its initial pick-up. A suitable resistor 75 in series with the coil 70 of the relay 72 is used for controlling this time constant In one specific embodiment of my invention, the capacitor 62 has a capacitance of 80 microfarads; the capacitor 64 has a capacitance of 0.4 microfarad; the resistor 66, a resistance of 25 ohms; the resistor 67, a resistance of 7 ohms; the control capacitor 68, a capacitance of 4 microfarads; and the resistor 75, a resistance of 12,500 ohms.

The above-described charging of the parallel capacitors 62 and 68 with energy discharged from the capacitor 64 took place in a period shorter than the minimum period of current flow through the gap device. For example, only 40 microseconds would be required in the above described specific embodiment to discharge the capacitor 64 to about 2% of its pre-discharge voltage. Accordingly, if the arc across the gap device is extinguished immediately, even at the first current zero, the control capacitor 68 will then be substantially fully charged and, in discharging thereafter, will be able to retain the blast valve control relay 72 in its operated position for at least several additional cycles. This will enable the blast valve 25 to remain open during the no-current interval between successive current pulses accompanying the above-described resonant condition. When the gap device 16 again arcs over to permit a second pulse of current through the gap device after several cycles of no-current therethrough, as above described, the control capacitor 68 will have its charge replenished by the same process as that of the original charging. The control capacitor 68 will thereafter discharge as hereinabove described to maintain the blast valve 25 open during the next no-current interval that might follow the second current pulse through the gap device.

Since the blast valve 25 has remained open during these no-current intervals, the timing relay 41 will have been continuously energized despite the no-current intervals. Thus, after the predetermined time for which the timing relay 41 is set (15 cycles), it will operate to close its contacts 42, thus causing the shorting switch 37 to close and complete the permanent bypass circuit 36.

When the gap device 16 arcs over as above described, the instantaneous voltage then appearing across it and, correspondingly, across the resonance-triggering circuit 60 may either be negative or positive. This means that, upon arc-over of the gap device 16, the left hand side of the capacitor 62 can be charged either to a positive or a negative voltage with respect to the right hand side depending upon the instantaneous voltage across the gap device prevailing at the time of gap arc-over. My circuit is rendered insensitive to the polarity of this voltage by using for the rectifier 76 a full-wave rectifier that allows the control capacitor 68 to be charged with the same polarity irrespective of the polarity of the voltage developed across the capacitor 62.

The usual condition that causes the gap device 16 to arc over is not the resonant circuit condition referred to hereinabove but, rather, is one that produces substantially continuous arcing across the gap device for a period considerably longer than the time required for the blast valve-control relay 72 to drop out. Hence, after the usual continuous arcing condition, the blast valve 25 will be free to close without interference from the supplementary coil 74, which is then deenergized as a result of prior drop-out of control relay 72.

In certain series capacitor installations, the capacitor units that constitute the capacitor bank are arranged so that they can be connected either in series or in parallel. Assuming that the capacitor bank comprises two capacitor units of equal size that are arranged for connection either in series or in parallel, then the gap device arc-over voltage is typically set for the series connection at twice the arc-over voltage for which it is set for the parallel connection. This is the case because the total voltage that the capacitor bank can safely withstand in a series connection is substantially twice that which it can withstand in the parallel connection inasmuch as each capacitor unit is subjected to half the total voltage in the series connection.

It is desirable that the capacitor 68 that supplies the discharge current for operating the blast valve control relay 70 be charged to substantially the same voltage in response to breakdown of the gap device 16 irrespective of whether the gap device is set to arc over at a first predetermined value (corresponding to the setting for the series connection) or at half this value (corresponding to the setting for the parallel connection). To compensate for this change in gap arc-over voltage, two series of resonance-triggering components, each series comprising components corresponding to the components 62, 64, 66, 67 shown in FIG. 1, are connected in series with each other across the gap device 16, as shown in FIG. 3. The same reference numerals as used in FIG. 1, but with the suffixes "a" and "b," are used in FIG. 3 to designate corresponding components of the resonance-triggering circuit. Only a single control capacitor 68 is provided in FIG. 3, and this control capacitor 68 is arranged so that it can be connected either across one of the larger capacitors (62b) or across the series combination of both of the larger capacitors (62a and 62b). If the gap device 16 arcs over at a given voltage, twice the voltage will appear across the series combination of the two capacitors 62a and 62b as would appear across a single capacitor 62b. If, on the other hand, the gap arcs over at twice the above-assumed arc-over voltage, then the same voltage would appear across one of the capacitors 62b as appeared across both of them in the first case.

Accordingly, when the main capacitor units 10a and 10b are connected in parallel and the gap device has an arc-over voltage of one-half of the series-connection arc-over voltage, the control capacitor 68 is connected across both of the larger capacitors 62a, 62b to double the voltage applied to the capacitor 68 in compensation for halving the arc-over voltage of the gap device 16. This is illustrated in FIG. 3 where the main capacitor units 10a, 10b are shown connected in parallel and the capacitor 68 is connected across the series combination of both the large capacitors 62a and 62b.

When the main transfer switches 80 and 82 are operated from their illustrated positions P to positions S, the main capacitor units are connected in series, and the arc-over voltage of the gap device is suitably adjusted by means (not shown) to double its arc-over voltage, as compared to the arc-over voltage for the paralled connection. To compensate for this doubling of arc-over voltage the control switch 86 is shifted from a position P to a position S, thereby connecting the capacitor 68 across only one of the larger capacitors 62b. Since the same voltage will appear across the single capacitor 62b as before appeared across the combination of capacitors 62a and 62b, it will be apparent that the capacitor 68 will be charged to the same voltage as before upon gap arc-over. This will enable drop out of the blast valve control relay 70 to be delayed for the same period of time for either of these two connections.

It should be noted that the contact S of the control switch 86 is connected to a point 89 on the resonance-triggering circuit between the capacitors 62a and 62b through a conductor 90, the metallic housing 92 of the protective equipment, and a conductor 93. Accordingly, when the transfer switch is moved to position S, one side of the full wave rectifier 76 is connected to point 89 on the resonance-triggering circuit.

While I have shown and described particular embodiments of my invention, it will be obvious to those skilled in the art that various changes and modifications may be made without departing from my invention in its broader aspects and I therefore, intend in the appended claims to cover all such changes and modifications as fall within the true spirit and scope of my invention.

What I claim as new and desire to secure by Letters Patent of the United States is:

1. In a protective arrangement for a series capacitor that comprises: (1) a gap device connected across the series capacitor and adapted to arc over when the voltage across said series capacitor reaches a first predetermined value, (2) blast valve means to cause a blast of dielectric fluid to flow through said gap device for terminating the flow of arcing current therethrough when the voltage across said series capacitor is maintained below a second predetermined level, and (3) blast valve control means actuatable in response to current flow through said gap device and effective while actuated to maintain said blast valve in an operated condition, the improvement comprising:
(a) seal-in means for maintaining said blast valve in an operated condition during a protracted period of intermittent arcing in which short current pulses flow through said gap device at intervals separated by no-current periods as long as several cycles in duration,
(b) said seal-in means comprising:
(i) a control circuit for said blast valve control means,
(ii) a control capacitor connected in said control circuit across said blast valve control means,
(iii) means normally effective while said gap device is non-conducting for holding the voltage across said control capacitor to a low value insufficient to cause actuation of said blast valve control means comprising a low impedance connected in said control circuit across said control capacitor during charging of said control capacitor,
(iv) means for charging said control capacitor in response to arc-over of said gap device,
(v) means including a rectifier connected in said control circuit between said low impedance and said control capacitor for blocking discharge of said control capacitor through said low impedance, and for confining discharge of said control capacitor to a circuit through said blast valve control means, thus prolonging the period in which said blast valve control means is maintained in an actuated condition.

2. The apparatus of claim 1 in which said rectifier is a full wave rectifier.

3. In a protective arrangement for a series capacitor that comprises: (1) a gap device connected across the series capacitor and adapted to arc over when the voltage across said series capacitor reaches a first predetermined value, (2) blast valve means to cause a blast of dielectric fluid to flow through said gap device for terminating the flow of arcing current therethrough when the voltage across said series capacitor is maintained below a second predetermined level, and (3) blast valve control means actuatable in response to current flow through said gap device and effective while actuated to maintain said blast valve in an operated condition, the improvement comprising:
(a) the series combination of first and second capacitors connected across said gap device, the second of said capacitors being much larger than the first,
(b) a resistor connected across the large capacitor for providing a discharge path for said larger capacitor and for limiting the voltage across said larger capacitor when the gap device is non-conducting,
(c) a third capacitor connected across said larger capacitor during charging of said third capacitor,
(d) a high time constant circuit for connecting said blast valve control means across said third capacitor,
(e) a rectifier connected between said larger capacitor and said third capacitor,
(f) said rectifier having its direction of conductivity arranged to permit said larger capacitor and said third capacitor to be charged in parallel but to block said third capacitor from discharging through said resistor,
(g) means for causing said larger and third capacitors to be charged with energy from said first capacitor when said gap device arcs over, thereby increasing the voltage across said larger and third capacitors and causing actuation of said blast valve control means when said gap device arcs over,
(h) said rectifier confining the discharge of said third capacitor to said high time constant circuit through said blast valve control means, thereby maintaining said blast valve control means actuated for a prolonged interval after said third capacitor begins discharging.

4. The apparatus of claim 3 in which said rectifier is a full wave rectifier.

5. In a protective arrangement for a series capacitor that comprises: (1) a gap device connected across said series capacitor and adapted to arc over when the voltage across said series capacitor reaches a first predetermined value, (2) means for rendering said gap device non-conductive when the voltage across said series capacitor is maintained below a second predetermined level, and (3) means including a timing relay for establishing a permanent bypass around said gap device in the event that said gap device continues arcing over for more than a predetermined period, the improvement comprising:
  (a) seal-in means for sensing a condition of intermittent arcing across said gap device and for causing said timing relay to be continuously energized during persistence of said intermittent arcing conditions, even during no-current periods as long as several electrical cycles at a commercial power frequency intervening between spaced arcing periods of said intermittent arcing conditions,
  (b) said seal-in means comprising:
    (i) control means for said timing relay effective when actuated to maintain said timing relay energized,
    (ii) a control circuit in which said control means is connected,
    (iii) a control capacitor connected in said control circuit across said control means,
    (iv) means for normally preventing actuation of said control means while said gap device is non-conducting comprising a low impedance connected in said control circuit across said control capacitor while said control capacitor is being charged,
    (v) means for charging said control capacitor in response to arc-over of said gap device, and
    (vi) means including a rectifier connected in said control circuit between said low impedance and said control capacitor for blocking discharge of said control capacitor through said low impedance and for confining discharge of said control capacitor to a circuit through said control means, thus prolonging the period in which said control means is maintained in an actuated condition.

6. The apparatus of claim 5 in which said rectifier is a full wave rectifier.

7. The apparatus of claim 3 in combination with switch means effective in one position for causing all of the voltage across said larger capacitor to be applied through said rectifier to said third capacitor and effective in another position for causing a predetermined fraction of said voltage to be applied to said third capacitor, said switch means being movable from said one position to said other position to compensate for a change in the arc-over voltage of said gap device from a first value to a second value which is said predetermined fractions of said first value.

8. The apparatus of claim 3 in combination with means for changing the effective capacitance of said second capacitor relative to said first capacitor to compensate for changes in the arc-over voltage of said gap device, whereby the voltage applied to said third capacitor when said gap device arcs over is maintained substantially the same despite changes in the arc-over voltage of said gap device.

9. Protective equipment comprising:
  (a) a gap device that is adapted to arc over when the voltage thereacross rises to a predetermined value,
  (b) the series combination of first and second capacitors connected across said gap device, the second of said capacitors being much larger than the first,
  (c) a resistor connected across the larger capacitor for providing a discharge path for said larger capacitor and for limiting the voltage across said large capacitor when the gap device is non-conducting,
  (d) a third capacitor connected across said larger capacitor during charging of said third capacitor,
  (e) normally-unactuated control means connected across said third capacitor through a high time constant circuit and adapted to be actuated when the voltage across said third capacitor reaches a predetermined level,
  (f) a rectifier connected between said larger capacitor and said third capacitor and having its direction of conductivity arranged to permit said larger capacitor and said third capacitor to be charged in parallel but to block said third capacitor from discharging through said resistor,
  (g) means for causing said larger and third capacitors to be charged with energy from said first capacitor in response to a sudden change of voltage across said gap device, thereby increasing the voltage across said larger and third capacitors above said predetermined level and causing actuation of said control means when said sudden change in voltage across said gap device occurs,
  (h) said rectifier confining the discharge of said third capacitor to said high time constant circuit through said control means, thereby maintaining said control means actuated for a prolonged period after said third capacitor begins discharging.

References Cited by the Examiner

UNITED STATES PATENTS 2,576,132  11/1951  Marbury.
2,760,121  8/1956  Roth.
2,819,429  1/1958  Skeats.

MILTON O. HIRSHFIELD, *Primary Examiner.*

SAMUEL BERNSTEIN, *Examiner.*

R. V. LUPO, *Assistant Examiner.*